(12) United States Patent
Huang et al.

(10) Patent No.: US 10,620,163 B2
(45) Date of Patent: Apr. 14, 2020

(54) METHOD FOR DETECTING DEFECT OF METAL PLATE

(71) Applicants: Hubei University of Technology, Wuhan, Hubei (CN); Tsinghua University, Beijing (CN); China Special Equipment Inspection and Research Institute, Beijing (CN); Eddysun (Xiamen) Electronic Co., Ltd., Xiamen, Fujian (CN); Huazhong University of Science and Technology, Wuhan, Hubei (CN)

(72) Inventors: Songling Huang, Beijing (CN); Xiaochun Song, Hubei (CN); Gongtian Shen, Beijing (CN); Wei Zhao, Beijing (CN); Junming Lin, Fujian (CN); Yihua Kang, Hubei (CN); Yu Zhang, Beijing (CN); Shen Wang, Beijing (CN)

(73) Assignees: HUBEI UNIVERSITY OF TECHNOLOGY, Wuhan, Hubei (CN); TSINGHUA UNIVERSITY, Beijing (CN); CHINA SPECIAL EQUIPMENT INSPECTION AND RESEARCH INSTITUTE, Beijing (CN); EDDYSUN (XIAMEN) ELECTRONIC CO., LTD., Xiamen, Fujian (CN); HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 337 days.

(21) Appl. No.: 15/801,313

(22) Filed: Nov. 1, 2017

(65) Prior Publication Data
US 2018/0172641 A1    Jun. 21, 2018

(30) Foreign Application Priority Data

Nov. 2, 2016    (CN) .......................... 2016 1 0952378

(51) Int. Cl.
*G01N 29/06* (2006.01)
*G01N 29/24* (2006.01)
(Continued)

(52) U.S. Cl.
CPC ......... *G01N 29/069* (2013.01); *G01N 29/043* (2013.01); *G01N 29/221* (2013.01);
(Continued)

(58) Field of Classification Search
CPC .. G01N 29/069; G01N 29/043; G01N 29/221; G01N 29/2412; G01N 2291/01;
(Continued)

(56) References Cited

U.S. PATENT DOCUMENTS

| | | | | |
|---|---|---|---|---|
| 7,082,833 | B2 * | 8/2006 | Heyman | G01N 29/07 73/598 |
| 2013/0327148 | A1 * | 12/2013 | Yan | G01N 29/34 73/628 |
| 2015/0073729 | A1 * | 3/2015 | Borigo | G01N 29/2412 702/39 |

OTHER PUBLICATIONS

Schwarz et al., "A 100-Element Ultrasonic Circular Array for Endoscopic Application in Medicine and NDT", Proceedings of the Nineteenth International Symposium, Apr. 3-5, 1991, edited by Helmut Ermert and Hans-Peter Harjes, pp. 193-199 (Year: 1991).*

* cited by examiner

*Primary Examiner* — Regis J Betsch
(74) *Attorney, Agent, or Firm* — Houtteman Law LLC

(57) ABSTRACT

A method for detecting a defect of a metal plate includes selecting N controllable emitting electromagnetic acoustic transducers EMATs as excitation transducers, and selecting
(Continued)

M omnidirectionally receiving EMATs as receiving transducers, exciting an ultrasonic guided wave in a metal plate by a $n^{th}$ controllable emitting EMAT with a predetermined emission angle; determining whether each of M1 omnidirectionally receiving EMATs and the $n^{th}$ controllable emitting EMAT form a scattering group; for the scattering group, solving a position of a scattering point and a direction of a scattering side according to a distance between $T_n$ and $R_{ml}$, the emission angle and a travel time of the ultrasonic guided wave; performing a curve fitting on all the scattering points in directions of respective scattering sides to obtain a contour image of the defect.

19 Claims, 4 Drawing Sheets

(51) Int. Cl.
    *G01N 29/04*     (2006.01)
    *G01N 29/22*     (2006.01)
    *G10K 11/35*     (2006.01)

(52) U.S. Cl.
    CPC ....... *G01N 29/2412* (2013.01); *G10K 11/352* (2013.01); *G01N 2291/011* (2013.01); *G01N 2291/0234* (2013.01); *G01N 2291/0289* (2013.01); *G01N 2291/106* (2013.01); *G01N 2291/2634* (2013.01)

(58) Field of Classification Search
    CPC ... G01N 2291/0234; G01N 2291/0289; G01N 2291/106; G01N 2291/2634; G10K 11/352
    See application file for complete search history.

```
┌─────────────────────────────────────────────────────────────────────┐
│ selecting N controllable emitting electromagnetic acoustic transducers EMATs as excitation │── S1
│ transducers, and selecting M omnidirectionally receiving EMATs as receiving transducers, │
│ where N and M are each positive integers, an emission angle of each of the N controllable │
│ emitting EMATs is in a range of θ₁ to θ₂ and has a step of θₛ, and a total number of the │
│ emission angles is L=(θ₂−θ₁)/θₛ+1 │
└─────────────────────────────────────────────────────────────────────┘
                                    ▼
┌─────────────────────────────────────────────────────────────────────┐
│ selecting an nᵗʰ controllable emitting EMAT as an excitation transducer Tₙ, where n=1,2,…,N │── S2
└─────────────────────────────────────────────────────────────────────┘
                                    ▼
┌─────────────────────────────────────────────────────────────────────┐
│ obtaining an emission angle θₗ of the nᵗʰ controllable emitting EMAT, and exciting an │── S3
│ ultrasonic guided wave in a metal plate to be detected by the nᵗʰ controllable emitting EMAT │
│ with the emission angle θₗ, where l=1,2,…,L │
└─────────────────────────────────────────────────────────────────────┘
                                    ▼
┌─────────────────────────────────────────────────────────────────────┐
│ selecting from the M omnidirectionally receiving EMATs M1 omnidirectionally receiving │
│ EMATs by which the ultrasonic guided wave in the metal plate is received and which are │── S4
│ denoted by R_{m1}, where m1=1,2,…,M1, and determining whether each of the M1 │
│ omnidirectionally receiving EMATs R_{m1} and the nᵗʰ controllable emitting EMAT Tₙ form a │
│ scattering group (Tₙ, R_{m1}), if yes, executing step S5, otherwise, executing step S7 │
└─────────────────────────────────────────────────────────────────────┘
                                    ▼
┌─────────────────────────────────────────────────────────────────────┐
│ for the scattering group (Tₙ, R_{m1}), solving a position P of a scattering point according to a │── S5
│ distance between Tₙ and R_{m1}, the emission angle and a travel time of the ultrasonic guided │
│ wave │
└─────────────────────────────────────────────────────────────────────┘
                                    ▼
┌─────────────────────────────────────────────────────────────────────┐
│ determining a propagation path and a scattering path of the ultrasonic guided wave, and │── S6
│ solving a direction of a scattering side, according to the position P of the scattering point and │
│ a position of the scattering group (Tₙ, R_{m1}) │
└─────────────────────────────────────────────────────────────────────┘
                                    ▼
┌─────────────────────────────────────────────────────────────────────┐
│ determining whether excitation and receiving of the ultrasonic guided wave with all the │── S7
│ emission angles θₗ are performed, if yes, executing step S8, otherwise, changing the emission │
│ angle to θ_{l+1} and returning to step S3 │
└─────────────────────────────────────────────────────────────────────┘
                                    ▼
┌─────────────────────────────────────────────────────────────────────┐
│ determining whether all the N controllable emitting EMATs have excited the ultrasonic │── S8
│ guided wave, if yes, executing step S9, otherwise, selecting an (n+1)ᵗʰ controllable emitting │
│ EMAT as an excitation transducer T_{n+1} and returning to step S2 │
└─────────────────────────────────────────────────────────────────────┘
                                    ▼
┌─────────────────────────────────────────────────────────────────────┐
│ performing a curve fitting on all the scattering points in directions of respective scattering │── S9
│ sides to obtain a contour image of the defect │
└─────────────────────────────────────────────────────────────────────┘
```

Fig. 1

METHOD FOR DETECTING DEFECT OF METAL PLATE

CROSS-REFERENCE TO RELATED APPLICATION

This application claims priority to and benefits of Chinese Patent Application Serial No. 201610952378.0, filed with the State Intellectual Property Office of P. R. China on Nov. 2, 2016, the entire content of which is incorporated herein by reference.

FIELD

The present disclosure relates to the field of nondestructive testing, and more particularly to a method for detecting a defect of a metal plate.

BACKGROUND

In a process for detecting a metal plate, the presence of a defect is determined in the metal plate or the position of the defect is determined if present. However, it is more important to obtain quantitative information (e.g., size, contour shape) on the defect, which is key for the evaluation of the health status of the metal plate and the maintenance of the metal plate. With increasingly strict requirements on the safety of the metal plate, there are needs to determine the contour shape of the defect, to image the defect with high precision, and to visualize a detection result of the defect.

Compared with the nondestructive testing technology in the related art, an ultrasonic guided wave has characteristics of low attenuation, far propagation distance, 100% coverage of the thickness of the metal plate by a sound field, ease to adjust the guided wave mode, etc., and the use of a magnetic acoustic array to detect an area surrounded by the array from multiple angles with the ultrasonic guided wave can provide more rich and accurate defect information for high-precision imaging of the defect. However, when the guided wave encounters a strong degree of scattering by the defect, the scattering effect will produce more artifacts in an image of the defect rebuilt by an imaging method with the ultrasonic guided wave in the related art, resulting in blind detection region and seriously affecting the defect location and imaging accuracy of the metal plate. In addition, the shape of an actual defect is very complex, scattering characteristics are varied, and it is difficult to find a unified model to describe the scattering process and extract the scattering characteristics. The above problem is a bottleneck problem that restricts the development of the electromagnetic ultrasonic guided wave detection technology and deteriorates the imaging quality of the defect.

SUMMARY

Embodiments of the present disclosure seek to solve at least one of the problems existing in the related art to at least some extent.

According to a first aspect of the present disclosure, a method for detecting a defect of a metal plate is provided. The method includes S1, selecting N controllable emitting electromagnetic acoustic transducers EMATs as excitation transducers, and selecting M omnidirectionally receiving EMATs as receiving transducers, where N and M are each positive integers, an emission angle of each of the N controllable emitting EMATs is in a range of $\theta_1$ to $\theta_2$ and has a step of $\theta_s$, and a total number of the emission angles is $L=(\theta_2-\theta_1)/\theta_s+1$; S2, selecting an $n^{th}$ controllable emitting EMAT as an excitation transducer $T_n$, where n=1, 2, ..., N; S3, obtaining an emission angle $\theta_l$ of the $n^{th}$ controllable emitting EMAT, and exciting an ultrasonic guided wave in a metal plate to be detected by the $n^{th}$ controllable emitting EMAT with the emission angle $\theta_l$, where l=1, 2, ..., L; S4, selecting from the M omnidirectionally receiving EMATs M1 omnidirectionally receiving EMATs by which the ultrasonic guided wave in the metal plate is received and which are denoted by $R_{ml}$, where ml=1, 2, ..., M1, and determining whether each of the M1 omnidirectionally receiving EMATs $R_{ml}$ and the $n^{th}$ controllable emitting EMAT $T_n$ form a scattering group $(T_n, R_{ml})$, if yes, executing step S5, otherwise, executing step S7; S5, for the scattering group $(T_n, R_{ml})$, solving a position P of a scattering point according to a distance between $T_n$ and $R_{ml}$, the emission angle and a travel time of the ultrasonic guided wave; S6, determining a propagation path and a scattering path of the ultrasonic guided wave, and solving a direction of a scattering side, according to the position P of the scattering point and a position of the scattering group $(T_n, R_{ml})$; S7, determining whether excitation and receiving of the ultrasonic guided wave with all the emission angles $\theta_l$ are performed, if yes, executing step S8, otherwise, changing the emission angle to $\theta_{l+1}$ and returning to step S3; S8, determining whether all the N controllable emitting EMATs have excited the ultrasonic guided wave, if yes, executing step S9, otherwise, selecting an $(n+1)^{th}$ controllable emitting EMAT as an excitation transducer $T_{n+1}$ and returning to step S2; S9, performing a curve fitting on all the scattering points in directions of respective scattering sides to obtain a contour image of the defect.

In an embodiment, each of the N controllable emitting EMATs includes a plurality of concentric open metal rings and a rotary slider embedded with a metal conductor for adjusting the emission angle.

In an embodiment, each of the M omnidirectionally receiving EMATs includes a densely packed coil having a pie shape as a receiving coil.

In an embodiment, the N controllable emitting EMATs and the M omnidirectionally receiving EMATs are uniformly arranged around a detection region of the metal plate to be detected in a circular array, and M=K*N, where K is a positive integer.

In an embodiment, the number of the omnidirectionally receiving EMATs between two adjacent controllable emitting EMATs is constant.

In an embodiment, step S4 includes: determining whether each of the M1 omnidirectionally receiving EMATs $R_{ml}$ and the $n^{th}$ controllable emitting EMAT $T_n$ form the scattering group according to the travel time of the ultrasonic guided wave, including:

obtaining a measured travel time $t_r$ for which the ultrasonic guided wave propagates from $T_n$ to $R_{ml}$, and a propagation speed v of the ultrasonic guided wave in the metal plate, establishing a planar rectangular coordinate system, obtaining a position T of the $n^{th}$ controllable emitting EMAT $T_n$ and a position R of the omnidirectionally receiving EMAT $R_{ml}$, and calculating a theoretical time $t_s$ for which the ultrasonic guided wave directly propagates from the position T to the position R along a straight line:

$$t_s = \frac{|\overrightarrow{TR}|}{v}$$

where $|\vec{TR}|$ is a length of a vector from the position T to the position R in the planar rectangular coordinate system;

determining that $R_{ml}$ and $T_n$ form the scattering group if $t_r > t_s$, otherwise, determining that $R_{ml}$ and $T_n$ do not form the scattering group.

In an embodiment, step S5 includes:

for the scattering group $(T_n, R_{ml})$, solving the position P of the scattering point according to the distance $\vec{TR}$ between $T_n$ and $R_{ml}$, the emission angle and the travel time $t_r$ of the ultrasonic guided wave, including:

obtaining a length $|\vec{RP}|$ of a vector $\vec{RP}$ according to the cosine theorem:

$$|\vec{RP}| = \sqrt{|\vec{PT}|^2 + |\vec{TR}|^2 - 2*|\vec{PT}|*|\vec{TR}|*\cos(\angle PTR)}$$

where $\angle PTR$ is known in $\Delta PTR$ in the planar rectangular coordinate system;

calculating a sum of a length $|\vec{PT}|$ of a vector $\vec{PT}$ and the length $|\vec{RP}|$ of the vector $\vec{RP}$ according to the measured travel time $t_r$ for which the ultrasonic guided wave propagates from $T_n$ to $R_{ml}$, and the propagation speed v of the ultrasonic guided wave in the metal plate:

$$|\vec{PT}| + |\vec{RP}| = v*t_r;$$

obtaining an equation:

$$|\vec{PT}| + \sqrt{|\vec{PT}|^2 + |\vec{TR}|^2 - 2*|\vec{PT}|*|\vec{TR}|*\cos(\angle PTR)} = v*t_r$$

determining the position P of the scattering point by solving the equation.

In an embodiment, step S6 includes:
calculating the direction $$\left.\frac{dy}{dx}\right|_P$$

of the scattering side by a formula:

$$\left.\frac{dy}{dx}\right|_P = \tan\left[\arctan\left(\left.\frac{dy}{dx}\right|_{\vec{PT}}\right) - \left(\frac{\pi}{2} - \frac{1}{2}*\angle RPT\right)\right].$$

In an embodiment, step S9 includes:
performing the curve fitting on all the scattering points to obtain a fitting curve D(x):

$$D(x) = \arg\left(\min \sum_{i=1}^{S} |\varphi(x_i) - y_i|^2 \quad \text{s.t.} \quad \left.\frac{d\varphi}{dx}\right|_{P_i} = \left.\frac{dy}{dx}\right|_{P_i}\right)$$

where S is the number of the scattering points and is a positive integer, $P_i(x_i, y_i)$ is a position of an $i^{th}$ scattering point, i=1, 2, . . . , S.

With the method for detecting the defect of the metal plate according to embodiments of the present disclosure, the controllable emitting EMATs and the omnidirectionally receiving EMATs are uniformly arranged around the detection region of the metal plate to be detected in the circular array, the scattering group is selected according to the travel time of the ultrasonic guided wave, a solving model and method for the position of the scattering point and the direction of the scattering side are established with high precision, the curve fitting is performed on all the scattering points in directions of respective scattering sides to obtain a sharp contour image of the defect. Thus, the position of the scattering point and the direction of the scattering side may be solved with high precision and fast calculation speed, and the defect of the metal plate may be imaged with high precision and high efficiency.

According to a second aspect of the present disclosure, a device for detecting a defect of a metal plate is provided. The device includes a processor, and a memory for storing instructions executable by the processor, in which the processor is configured to perform the method for detecting the defect of the metal plate according to the first aspect of the present disclosure.

According to a third aspect of the present disclosure, a non-transitory computer-readable storage medium is provided having stored therein instructions that, when executed by a processor of a mobile terminal, causes the mobile terminal to perform a method for detecting the defect of the metal plate according to the first aspect of the present disclosure.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a flow chart of a method for detecting a defect of a metal plate according to an embodiment of the present disclosure;

DETAILED DESCRIPTION

Figure 2:
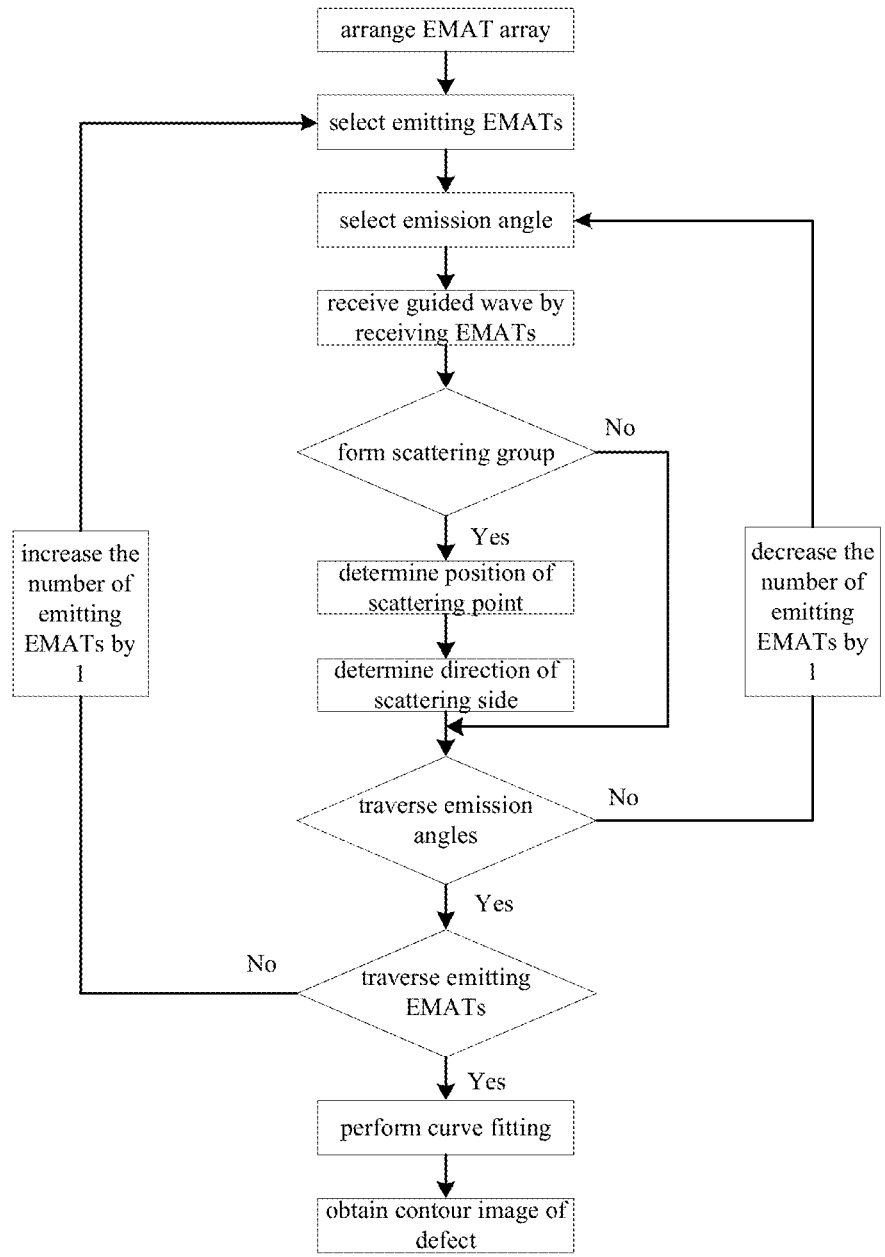
FIG. 2 is a flow chart of a method for detecting a defect of a metal plate according to another embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

As used herein, the term "controllable emitting EMAT" refers to an electromagnetic acoustic transducer with a controllable emission direction, i.e. an electromagnetic acoustic transducer which emits a guided wave in a specific direction, and the term "omnidirectionally receiving EMAT" refers to an electromagnetic acoustic transducer which receives guided waves in all directions.

A method for detecting a defect of a metal plate according to an embodiment of the present disclosure will be described below with reference to the drawings.

FIG. 1 is a flow chart of a method for detecting a defect of a metal plate according to an embodiment of the present disclosure. FIG. 2 is a flow chart of a method for detecting a defect of a metal plate according to another embodiment of the present disclosure. As shown in FIGS. 1-2, the method includes the following steps.

At step S1, N controllable emitting EMATs (electromagnetic acoustic transducers) are selected as excitation transducers, and M omnidirectionally receiving EMATs are selected as receiving transducers, where N and M are each positive integers, an emission angle of each of the N controllable emitting EMATs is in a range of $\theta_1$ to $\theta_2$ and has a step of $\theta_s$, and a total number of the emission angles is $L=(\theta_2-\theta_1)/\theta_s+1$.

Figure 3:
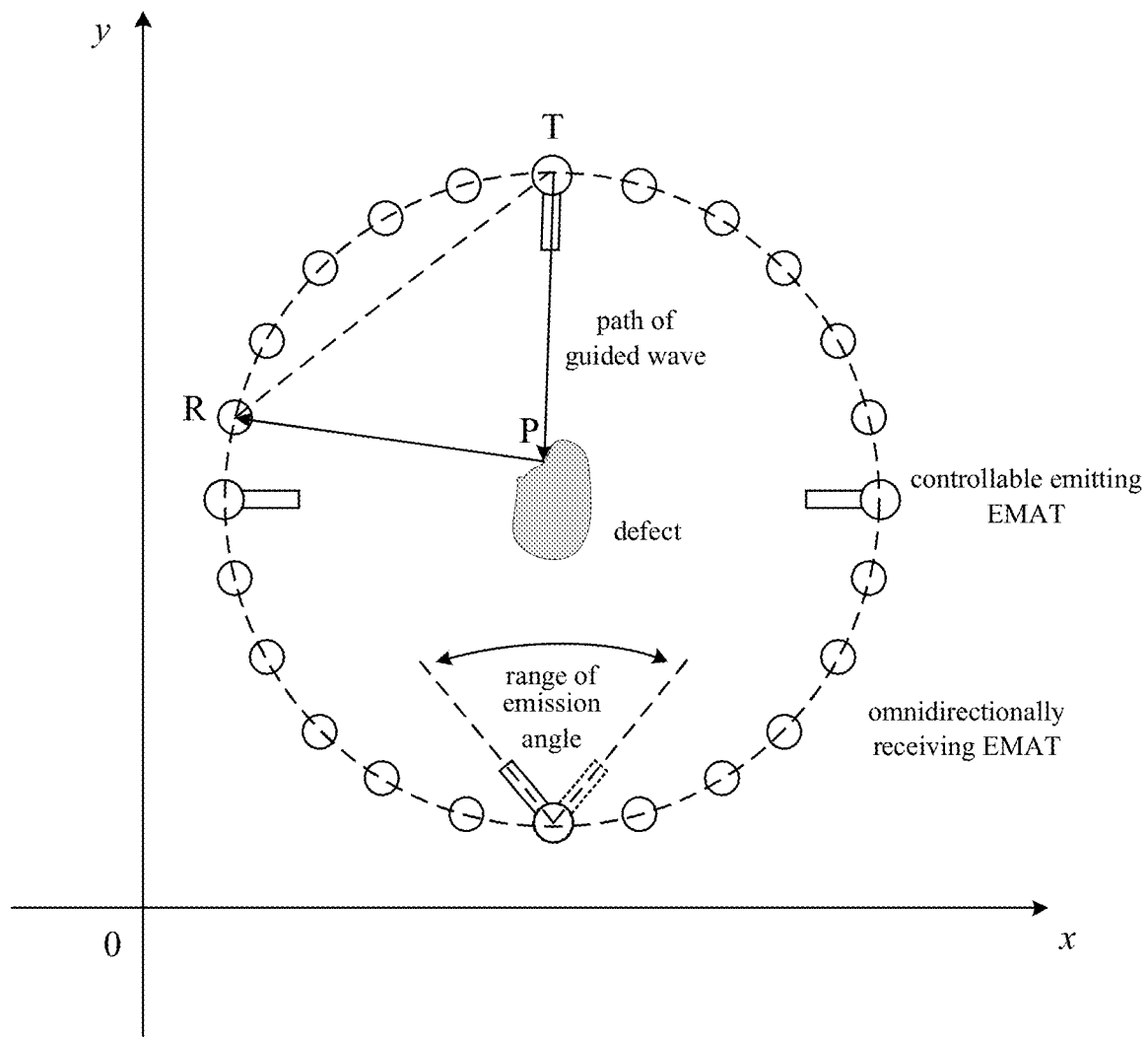
FIG. 3 is a schematic diagram of an experimental structure according to an embodiment of the present disclosure.

In an embodiment, as shown in FIG. 3, each of the N controllable emitting EMATs includes a plurality of concentric open metal rings and a rotary slider embedded with a metal conductor for adjusting the emission angle. On the other hand, each of the M omnidirectionally receiving EMATs includes a densely packed coil having a pie shape as a receiving coil. Specifically, the N controllable emitting EMATs and the M omnidirectionally receiving EMATs are uniformly arranged around a detection region of the metal plate to be detected in a circular array, and M=K*N, where K is a positive integer. Moreover, the number of the omnidirectionally receiving EMATs between two adjacent controllable emitting EMATs is constant.

At step S2, an $n^{th}$ controllable emitting EMAT is selected as an excitation transducer $T_n$, where n=1, 2, ..., N.

At step S3, an emission angle $\theta_l$ of the $n^{th}$ controllable emitting EMAT is obtained, and an ultrasonic guided wave is excited in a metal plate to be detected by the $n^{th}$ controllable emitting EMAT with the emission angle $\theta_l$, where l=1, 2, ..., L.

At step S4, M1 omnidirectionally receiving EMATs by which the ultrasonic guided wave in the metal plate is received and which are denoted by $R_{ml}$, where ml=1, 2, ..., M1, are selected from the M omnidirectionally receiving EMATs, and it is determined whether each of the M1 omnidirectionally receiving EMATs ($R_{ml}$) and the $n^{th}$ controllable emitting EMAT ($T_n$) form a scattering group ($T_n$, $R_{ml}$), if yes, step S5 is executed, otherwise, step S7 is executed. In other words, if the M omnidirectionally receiving EMATs M1 receives the ultrasonic guided wave in the metal plate, assuming that the ultrasonic guided wave is received by M1 omnidirectionally receiving EMATs and the M1 omnidirectionally receiving EMATs are denoted by $R_{ml}$, where ml=1, 2, ..., M1, then it is determined whether $R_{ml}$ and $T_n$ form a scattering group ($T_n$, $R_{ml}$), if yes, step S5 is executed, otherwise, step S7 is executed.

In an embodiment, step S4 includes:

determining whether each of the M1 omnidirectionally receiving EMATs ($R_{ml}$) and the $n^{th}$ controllable emitting EMAT ($T_n$) form the scattering group according to the travel time of the ultrasonic guided wave, which includes:

obtaining a measured travel time $t_r$ for which the ultrasonic guided wave propagates from $T_n$ to $R_{ml}$, and a propagation speed v of the ultrasonic guided wave in the metal plate, establishing a planar rectangular coordinate system, obtaining a position T of the $n^{th}$ controllable emitting EMAT ($T_n$) and a position R of the omnidirectionally receiving EMAT ($R_{ml}$), and calculating a theoretical time $t_s$ for which the ultrasonic guided wave directly propagates from the position T to the position R along a straight line:

$$t_s = \frac{|\vec{TR}|}{v}$$

where $|\vec{TR}|$ is a length of a vector from the position T to the position R in the planar rectangular coordinate system;

determining that $R_{ml}$ and $T_n$ form the scattering group if $t_r > t_s$, otherwise, determining that $R_{ml}$ and $T_n$ do not form the scattering group.

At step S5, for the scattering group ($T_n$, $R_{ml}$), a position P of a scattering point is solved according to a distance between $T_n$ and $R_{ml}$, the emission angle and a travel time of the ultrasonic guided wave.

In an embodiment, step S5 includes: for the scattering group ($T_n$, $R_{ml}$), solving the position P of the scattering point according to the distance $\vec{TR}$ between $T_n$ and $R_{ml}$, the emission angle and the travel time $t_r$ of the ultrasonic guided wave. In the planar rectangular coordinate system, since the emission direction is known and the scattering point must be located in the emission direction, if a length of a vector $\vec{PT}$ is obtained, the position P of the scattering point may be determined. Specifically, the length $|\vec{RP}|$ of the vector $\vec{RP}$ is obtained according to the cosine theorem:

$$|\vec{RP}| = \sqrt{|\vec{PT}|^2 + |\vec{TR}|^2 - 2*|\vec{PT}|*|\vec{TR}|*\cos(\angle PTR)}$$

where $\angle PTR$ is known in $\triangle PTR$ in the planar rectangular coordinate system;

a sum of a length $|\overrightarrow{PT}|$ of a vector $\overrightarrow{PT}$ and the length $|\overrightarrow{RP}|$ of the vector $\overrightarrow{RP}$ is calculated according to the measured travel time $t_r$ for which the ultrasonic guided wave propagates from $T_n$ to $R_{ml}$, and the propagation speed v of the ultrasonic guided wave in the metal plate:

$$|\overrightarrow{PT}|+|\overrightarrow{RP}|=v*t_r;$$

an equation is obtained:

$$|\overrightarrow{PT}| + \sqrt{|\overrightarrow{PT}|^2 + |\overrightarrow{TR}|^2 - 2*|\overrightarrow{PT}|*|\overrightarrow{TR}|*\cos(\angle PTR)} = v*t_r$$

the position P of the scattering point is determined by solving the equation, since only $|\overrightarrow{PT}|$ is unknown in the equation.

At step S6, according to the position P of the scattering point and a position of the scattering group $(T_n, R_{ml})$, a propagation path and a scattering path of the ultrasonic guided wave are determined, and a direction of a scattering side is solved.

Specifically, step S6 includes:
calculating the direction $$\left.\frac{dy}{dx}\right|_P$$

of the scattering side in the planar rectangular coordinate system by a formula:

$$\left.\frac{dy}{dx}\right|_P = \tan\left[\arctan\left(\left.\frac{dy}{dx}\right|_{\overrightarrow{PT}}\right) - \left(\frac{\pi}{2} - \frac{1}{2}*\angle RPT\right)\right].$$

At step S7, it is determined whether excitation and receiving of the ultrasonic guided wave with all the emission angles $\theta_l$ are performed, if yes, step S8 is executed, otherwise, the emission angle is changed to $\theta_{l+1}$ and the process returns to step S3.

At step S8, it is determined whether all the N controllable emitting EMATs have excited the ultrasonic guided wave, if yes, step S9 is executed, otherwise, an $(n+1)^{th}$ controllable emitting EMAT is selected as an excitation transducer $T_{n+1}$ and the process returns to step S2.

At step S9, a curve fitting is performed on all the scattering points in directions of respective scattering sides to obtain a contour image of the defect.

Specifically, step S9 includes:
performing the curve fitting on all the scattering points to obtain a fitting curve $D(x)$:

$$D(x) = \arg\left(\min\sum_{i=1}^{S} |\varphi(x_i) - y_i|^2 \text{ s.t. } \left.\frac{d\varphi}{dx}\right|_{P_i} = \left.\frac{dy}{dx}\right|_{P_i}\right)$$

where S is the number of the scattering points and is a positive integer, $P_i(x_i, y_i)$ is a position of an $i^{th}$ scattering point in the planar rectangular coordinate system, i=1, 2, . . . , S.

In order to better understand the present disclosure, the magnetic acoustic array guided wave scattering imaging method of the defect of the metal plate according to embodiments of the present disclosure will be described in detail with reference to the drawings.

Embodiment 1

In this embodiment, the method for detecting the defect of the metal plate includes the following steps.

At step 1, 4 (i.e. N=4) controllable emitting EMATs are selected as excitation transducers, and 20 (i.e. M=20) omnidirectionally receiving EMATs are selected as receiving transducers. The 4 controllable emitting EMATs and the 20 omnidirectionally receiving EMATs are uniformly arranged around a detection region of a steel plate to be detected in a circular array, and the number of the omnidirectionally receiving EMATs between two adjacent controllable emitting EMATs is 5. Further, for example, the steel plate has a thickness of 4 mm, and the circular array has a diameter of, e.g., 1 m. For example, an emission angle of each of the 4 controllable emitting EMATs is in a range of 0 to 80° and has a step of 8°.

At step 2, an $n^{th}$ controllable emitting EMAT is selected from the 4 controllable emitting EMATs as an excitation transducer $T_n$, where n=1, 2, 3, 4.

At step 3, an emission angle $\theta_l$ of the $n^{th}$ controllable emitting EMAT is selected, and an ultrasonic guided wave is excited in the steel plate to be detected by the $n^{th}$ controllable emitting EMAT with the emission angle $\theta_l$, where l=1, 2, . . . , 11.

At step 4, it is determined whether each of M1 omnidirectionally receiving EMATs ($R_{ml}$) by which the ultrasonic guided wave is received, where ml=1, 2, . . . , M1, and the $n^{th}$ controllable emitting EMAT ($T_n$) form a scattering group ($T_n$, $R_{ml}$). A measured travel time $t_r$ for which the ultrasonic guided wave propagates from $T_n$ to $R_{ml}$ is obtained, and a propagation speed v of the ultrasonic guided wave in the steel plate is 3200 m/s, a planar rectangular coordinate system is established, a position T of the $n^{th}$ controllable emitting EMAT ($T_n$) and a position R of the omnidirectionally receiving EMAT ($R_{ml}$) are obtained, and a theoretical time $t_s$ for which the ultrasonic guided wave directly propagates from the position T to the position R along a straight line is calculated:

$$t_s = \frac{|\overrightarrow{TR}|}{v}$$

where $|\overrightarrow{TR}|$ is a length of a vector from the position T to the position R in the planar rectangular coordinate system.

If $t_r > t_s$, it is determined that $R_{ml}$ and $T_n$ form the scattering group, otherwise, it is determined that $R_{ml}$ and $T_n$ do not form the scattering group.

If it is determined that $R_{ml}$ and $T_n$ form the scattering group, step 5 is executed, otherwise, step 7 is executed.

At step 5, for the scattering group ($T_n$, $R_{ml}$), a position P of a scattering point is solved according to a distance $\overrightarrow{TR}$ between $T_n$ and $R_{ml}$, the emission angle and the travel time $t_r$ of the ultrasonic guided wave.

In the planar rectangular coordinate system, since the emission direction is known and the scattering point must be located in the emission direction, if a length of a vector $\overrightarrow{PT}$ is obtained, the position P of the scattering point may be determined. Specifically, the length $|\vec{RP}|$ of the vector $\vec{RP}$ is obtained according to the cosine theorem:

$$|\vec{RP}| = \sqrt{|\vec{PT}|^2 + |\vec{TR}|^2 - 2*|\vec{PT}|*|\vec{TR}|*\cos(\angle PTR)}$$

where $\angle PTR$ is known in $\Delta PTR$ in the planar rectangular coordinate system;

a sum of a length $|\vec{PT}|$ of a vector $\vec{PT}$ and the length $|\vec{RP}|$ of the vector $\vec{RP}$ is calculated according to the measured travel time $t_r$, for which the ultrasonic guided wave propagates from $T_n$ to $R_{ml}$, and the propagation speed v of the ultrasonic guided wave in the metal plate:

$$|\vec{PT}|+|\vec{RP}|=v*t_r;$$

so an equation is obtained:

$$|\vec{PT}| + \sqrt{|\vec{PT}|^2 + |\vec{TR}|^2 - 2*|\vec{PT}|*|\vec{TR}|*\cos(\angle PTR)} = v*t_r$$

the position P of the scattering point is determined by solving the equation, since only $|\vec{PT}|$ is unknown in the equation.

At step 6, according to the position P of the scattering point and a position of the scattering group $(T_n, R_{ml})$, a propagation path and a scattering path of the ultrasonic guided wave are determined, and a direction $$\left.\frac{dy}{dx}\right|_P$$

of a scattering side is solved in the planar rectangular coordinate system:

$$\left.\frac{dy}{dx}\right|_P = \tan\left[\arctan\left(\left.\frac{dy}{dx}\right|_{\vec{PT}}\right) - \left(\frac{\pi}{2} - \frac{1}{2}*\angle RPT\right)\right].$$

At step 7, it is determined whether excitation and receiving of the ultrasonic guided wave with all the emission angles $\theta_l$ are performed, if yes, step 8 is executed, otherwise, the emission angle is changed to $\theta_{l+1}$ and the process returns to step 3.

At step 8, it is determined whether all the 4 controllable emitting EMATs have excited the ultrasonic guided wave, if yes, step 9 is executed, otherwise, an $(n+1)^{th}$ controllable emitting EMAT is selected as an excitation transducer $T_{n+1}$ and the process returns to step 2.

At step 9, a curve fitting is performed on all the scattering points in directions of respective scattering sides to obtain a fitting curve D(x) with 31 (i.e. S=31) scattering points:

$$D(x) = \arg\left(\min\sum_{i=1}^{S} |\varphi(x_i) - y_i|^2 \text{ s.t. } \left.\frac{d\varphi}{dx}\right|_{P_i} = \left.\frac{dy}{dx}\right|_{P_i}\right)$$

where $P_i(x_i, y_i)$ is a position of an $i^{th}$ scattering point in the planar rectangular coordinate system, i=1, 2, . . . , 31.

Figure 4:
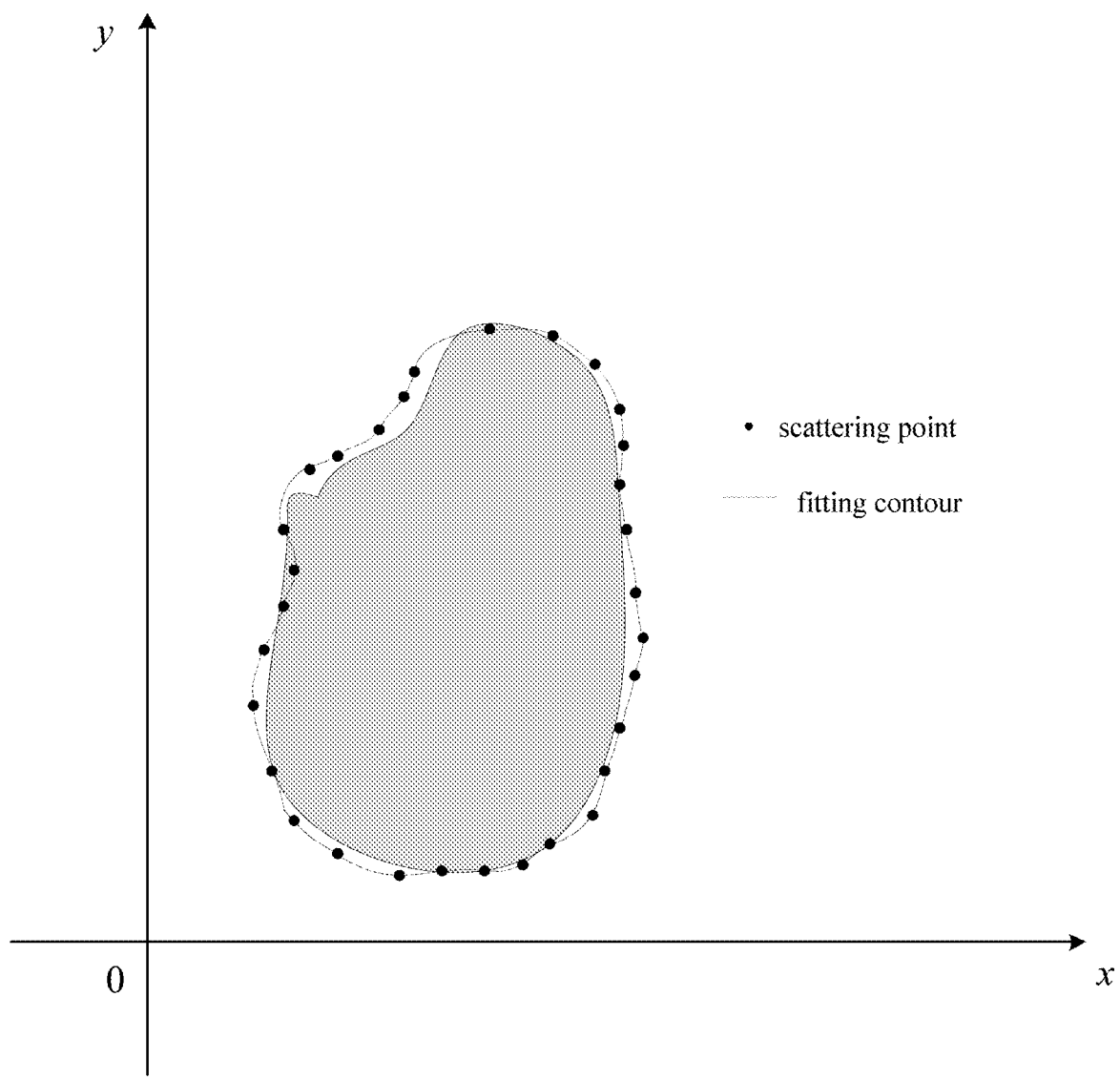
FIG. 4 is a schematic diagram of a result of a magnetic acoustic array guided wave scattering imaging of an defect of a metal plate according to an embodiment of the present disclosure.

In this embodiment, a contour image of the defect obtained by this method is shown in FIG. 4, which has 31 scattering points, and the fitting curve formed according to the position of the scattering points and the directions of respective scattering sides is very close to a real contour of the defect of the steel plate. Thus, with the method for detecting the defect of the metal plate according to embodiments of the present disclosure, the defect of the metal plate may be imaged with high precision, and the contour image of the defect may be sharp.

Embodiment 2

In this embodiment, the method for detecting the defect of the metal plate includes the following steps.

At step A, 6 (i.e. N=6) controllable emitting EMATs are selected as excitation transducers, and 18 (i.e. M=18) omnidirectionally receiving EMATs are selected as receiving transducers. The 6 controllable emitting EMATs and the 18 omnidirectionally receiving EMATs are uniformly arranged around a detection region of an aluminium plate to be detected in a circular array, and the number of the omnidirectionally receiving EMATs between two adjacent controllable emitting EMATs is 3. Further, for example, the aluminium plate has a thickness of 3 mm, and the circular array has a diameter of, e.g., 0.8 m. For example, an emission angle of each of the 6 controllable emitting EMATs is in a range of 0 to 90° and has a step of 10°.

At step B, an $n^{th}$ controllable emitting EMAT is selected from the 6 controllable emitting EMATs as an excitation transducer $T_n$, where n=1, 2, 3, 4, 5, 6.

At step C, an emission angle $\theta_l$ of the $n^{th}$ controllable emitting EMAT is selected, and an ultrasonic guided wave is excited in the aluminium plate to be detected by the $n^{th}$ controllable emitting EMAT with the emission angle $\theta_l$, where l=1, 2, . . . , 10.

At step D, it is determined whether each of M1 omnidirectionally receiving EMATs $(R_{ml})$ by which the ultrasonic guided wave is received, where ml=1, 2, . . . , M1, and the $n^{th}$ controllable emitting EMAT $(T_n)$ form a scattering group $(T_n, R_{ml})$. A measured travel time $t_r$ for which the ultrasonic guided wave propagates from $T_n$ to $R_{ml}$ is obtained, and a propagation speed v of the ultrasonic guided wave in the aluminium plate is 2548 m/s, a planar rectangular coordinate system is established, a position T of the $n^{th}$ controllable emitting EMAT $(T_n)$ and a position R of the omnidirectionally receiving EMAT $(R_{ml})$ are obtained, and a theoretical time $t_s$ for which the ultrasonic guided wave directly propagates from the position T to the position R along a straight line is calculated:

$$t_s = \frac{|\vec{TR}|}{v}$$

where $|\vec{TR}|$ is a length of a vector from the position T to the position R in the planar rectangular coordinate system.

If $t_r > t_s$, it is determined that $R_{ml}$ and $T_n$ form the scattering group, otherwise, it is determined that $R_{ml}$ and $T_n$ do not form the scattering group.

If it is determined that $R_{ml}$ and $T_n$ form the scattering group, step E is executed, otherwise, step G is executed.

At step E, for the scattering group $(T_n, R_{ml})$, a position P of a scattering point is solved according to a distance $\vec{TR}$ between $T_n$ and $R_{ml}$, the emission angle and the travel time $t_r$ of the ultrasonic guided wave.

In the planar rectangular coordinate system, since the emission direction is known and the scattering point must be located in the emission direction, if a length of a vector $\overrightarrow{PT}$ is obtained, the position P of the scattering point may be determined. Specifically, the length $|\overrightarrow{RP}|$ of the vector $\overrightarrow{RP}$ is obtained according to the cosine theorem:

$$|\overrightarrow{RP}| = \sqrt{|\overrightarrow{PT}|^2 + |\overrightarrow{TR}|^2 - 2*|\overrightarrow{PT}|*|\overrightarrow{TR}|*\cos(\angle PTR)}$$

where $\angle PTR$ is known in $\Delta PTR$ in the planar rectangular coordinate system;

a sum of a length $|\overrightarrow{PT}|$ of a vector $\overrightarrow{PT}$ and the length $|\overrightarrow{RP}|$ of the vector $\overrightarrow{RP}$ is calculated according to the measured travel time $t_r$ for which the ultrasonic guided wave propagates from $T_n$ to $R_{ml}$, and the propagation speed v of the ultrasonic guided wave in the metal plate:

$$|\overrightarrow{PT}|+|\overrightarrow{RP}|=v*t_r;$$

so an equation is obtained:

$$|\overrightarrow{PT}| + \sqrt{|\overrightarrow{PT}|^2 + |\overrightarrow{TR}|^2 - 2*|\overrightarrow{PT}|*|\overrightarrow{TR}|*\cos(\angle PTR)} = v*t_r$$

the position P of the scattering point is determined by solving the equation, since only $|\overrightarrow{PT}|$ is unknown in the equation.

At step F, according to the position P of the scattering point and a position of the scattering group $(T_n, R_{ml})$, a propagation path and a scattering path of the ultrasonic guided wave are determined, and a direction $$\left.\frac{dy}{dx}\right|_P$$

of a scattering side is solved in the planar rectangular coordinate system:

$$\left.\frac{dy}{dx}\right|_P = \tan\left[\arctan\left(\left.\frac{dy}{dx}\right|_{\overrightarrow{PT}}\right) - \left(\frac{\pi}{2} - \frac{1}{2}*\angle RPT\right)\right].$$

At step G it is determined whether excitation and receiving of the ultrasonic guided wave with all the emission angles $\theta_i$ are performed, if yes, step H is executed, otherwise, the emission angle is changed to $\theta_{i+1}$ and the process returns to step C.

At step H, it is determined whether all the 6 controllable emitting EMATs have excited the ultrasonic guided wave, if yes, step I is executed, otherwise, an $(n+1)^{th}$ controllable emitting EMAT is selected as an excitation transducer $T_{n+1}$ and the process returns to step B.

At step I, a curve fitting is performed on all the scattering points in directions of respective scattering sides to obtain a fitting curve D(x) with 49 (i.e. S=49) scattering points:

$$D(x) = \arg\left(\min\sum_{i=1}^{S}|\varphi(x_i) - y_i|^2 \text{ s.t. } \left.\frac{d\varphi}{dx}\right|_{P_i} = \left.\frac{dy}{dx}\right|_{P_i}\right)$$

where $P_i(x_i, y_i)$ is a position of an $i^{th}$ scattering point in the planar rectangular coordinate system, i=1, 2, . . . , 49.

With the method for detecting the defect of the metal plate according to embodiments of the present disclosure, the controllable emitting EMATs and the omnidirectionally receiving EMATs are uniformly arranged around the detection region of the metal plate to be detected in the circular array, the scattering group is selected according to the travel time of the ultrasonic guided wave, a solving model and method for the position of the scattering point and the direction of the scattering side are established with high precision, the curve fitting is performed on all the scattering points in directions of respective scattering sides to obtain a sharp contour image of the defect. Thus, the position of the scattering point and the direction of the scattering side may be solved with high precision and fast calculation speed, and the defect of the metal plate may be imaged with high precision and high efficiency.

According to an embodiment of the present disclosure, a device for detecting a defect of a metal plate is provided. The device includes a processor, and a memory for storing instructions executable by the processor, in which the processor is configured to perform the method for detecting the defect of the metal plate according to the abovementioned embodiments of the present disclosure.

According to an embodiment of the present disclosure, a non-transitory computer-readable storage medium is provided having stored therein instructions that, when executed by a processor of a mobile terminal, causes the mobile terminal to perform a method for detecting the defect of the metal plate according to the abovementioned embodiments of the present disclosure.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can include any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for detecting a defect of a metal plate, comprising:

S1, selecting N controllable emitting electromagnetic acoustic transducers EMATs as excitation transducers, and selecting M omnidirectionally receiving EMATs as receiving transducers, where N and M are each positive integers, an emission angle of each of the N controllable emitting EMATs is in a range of $\theta_1$ to $\theta_2$ and has a step of $\theta_s$, and a total number of the emission angles is $L=(\theta_2-\theta_1)/\theta_s+1$;

S2, selecting an $n^{th}$ controllable emitting EMAT as an excitation transducer $T_n$, where n=1, 2, . . . , N;

S3, obtaining an emission angle $\theta_l$ of the $n^{th}$ controllable emitting EMAT, and exciting an ultrasonic guided wave in a metal plate to be detected by the $n^{th}$ controllable emitting EMAT with the emission angle $\theta_l$, where l=1, 2, . . . , L;

S4, selecting from the M omnidirectionally receiving EMATs M1 omnidirectionally receiving EMATs by which the ultrasonic guided wave in the metal plate is received and which are denoted by $R_{ml}$, where ml=1, 2, . . . , M1 and determining whether each of the M1 omnidirectionally receiving EMATs $R_{ml}$ and the $n^{th}$ controllable emitting EMAT $T_n$ form a scattering group $(T_n, R_{ml})$, if yes, executing step S5, otherwise, executing step S7;

S5, for the scattering group $(T_n, R_{ml})$, solving a position P of a scattering point according to a distance between $T_n$ and $R_{ml}$, the emission angle and a travel time of the ultrasonic guided wave;

S6, determining a propagation path and a scattering path of the ultrasonic guided wave, and solving a direction of a scattering side, according to the position P of the scattering point and a position of the scattering group $(T_n, R_{ml})$;

S7, determining whether excitation and receiving of the ultrasonic guided wave with all the emission angles $\theta_l$ are performed, if yes, executing step S8, otherwise, changing the emission angle to $\theta_{l+1}$ and returning to step S3;

S8, determining whether all the N controllable emitting EMATs have excited the ultrasonic guided wave, if yes, executing step S9, otherwise, selecting an $(n+1)^{th}$ controllable emitting EMAT as an excitation transducer $T_{n+1}$ and returning to step S2;

S9, performing a curve fitting on all the scattering points in directions of respective scattering sides to obtain a contour image of the defect.

2. The method of claim 1, wherein each of the N controllable emitting EMATs comprises a plurality of concentric open metal rings and a rotary slider embedded with a metal conductor for adjusting the emission angle.

3. The method of claim 1, wherein each of the M omnidirectionally receiving EMATs comprises a densely packed coil having a pie shape as a receiving coil.

4. The method of claim 1, wherein the N controllable emitting EMATs and the M omnidirectionally receiving EMATs are uniformly arranged around a detection region of the metal plate to be detected in a circular array, and M=K*N, where K is a positive integer.

5. The method of claim 4, wherein the number of the omnidirectionally receiving EMATs between two adjacent controllable emitting EMATs is constant.

6. The method of claim 1, wherein step S4 comprises:
determining whether each of the M1 omnidirectionally receiving EMATs $R_{ml}$ and the $n^{th}$ controllable emitting EMAT $T_n$ form the scattering group according to the travel time of the ultrasonic guided wave, comprising:
obtaining a measured travel time $t_r$ for which the ultrasonic guided wave propagates from $T_n$ to $R_{ml}$, and a propagation speed v of the ultrasonic guided wave in the metal plate, establishing a planar rectangular coordinate system, obtaining a position T of the $n^{th}$ controllable emitting EMAT $T_n$ and a position R of the omnidirectionally receiving EMAT $R_{ml}$, and calculating a theoretical time $t_s$ for which the ultrasonic guided wave directly propagates from the position T to the position R along a straight line:

$$t_s = \frac{|\overrightarrow{TR}|}{v}$$

where $|\overrightarrow{TR}|$ is a length of a vector from the position T to the position R in the planar rectangular coordinate system;
determining that $R_{ml}$ and $T_n$ form the scattering group if $t_r > t_s$, otherwise, determining that $R_{ml}$ and $T_n$ do not form the scattering group.

7. The method of claim 6, wherein step S5 comprises:
for the scattering group $(T_n, R_{ml})$, solving the position P of the scattering point according to the distance $\overrightarrow{TR}$ between $T_n$ and $R_{ml}$, the emission angle and the travel time $t_r$ of the ultrasonic guided wave, comprising:
obtaining a length $|\overrightarrow{RP}|$ of a vector $\overrightarrow{RP}$ according to the cosine theorem:

$$|\overrightarrow{RP}| = \sqrt{|\overrightarrow{PT}|^2 + |\overrightarrow{TR}|^2 - 2*|\overrightarrow{PT}|*|\overrightarrow{TR}|*\cos(\angle PTR)}$$

where $\angle PTR$ is known in $\Delta PTR$ in the planar rectangular coordinate system;
calculating a sum of a length $|\overrightarrow{PT}|$ of a vector $\overrightarrow{PT}$ and the length $|\overrightarrow{RP}|$ of the vector $\overrightarrow{RP}$ according to the measured travel time $t_r$ for which the ultrasonic guided wave propagates from $T_n$ to $R_{ml}$, and the propagation speed v of the ultrasonic guided wave in the metal plate:

$$|\overrightarrow{PT}| + |\overrightarrow{RP}| = v*t_r;$$

obtaining an equation:

$$|\overrightarrow{PT}| + \sqrt{|\overrightarrow{PT}|^2 + |\overrightarrow{TR}|^2 - 2*|\overrightarrow{PT}|*|\overrightarrow{TR}|*\cos(\angle PTR)} = v*t_r$$

determining the position P of the scattering point by solving the equation.

8. The method of claim 7, wherein step S6 comprises:
calculating the direction $$\left.\frac{dy}{dx}\right|_P$$

of the scattering side by a formula:

$$\left.\frac{dy}{dx}\right|_P = \tan\left[\arctan\left(\left.\frac{dy}{dx}\right|_{\overrightarrow{PT}}\right) - \left(\frac{\pi}{2} - \frac{1}{2}*\angle RPT\right)\right].$$

9. The method of claim 8, wherein step S9 comprises:
performing the curve fitting on all the scattering points to obtain a fitting curve D(x):

$$D(x) = \arg\left(\min \sum_{i=1}^{S} |\varphi(x_i) - y_i|^2 \text{s.t.} \left.\frac{d\varphi}{dx}\right|_{P_i} = \left.\frac{dy}{dx}\right|_{P_i}\right)$$

where S is the number of the scattering points and is a positive integer, $P_i(x_i, y_i)$ is a position of an $i^{th}$ scattering point, i=1, 2, ..., S.

10. A device for detecting a defect of a metal plate, comprising:
a processor; and
a memory for storing instructions executable by the processor;
wherein the processor is configured to perform a method for detecting the defect of the metal plate, the method comprising:
S1, selecting N controllable emitting electromagnetic acoustic transducers EMATs as excitation transducers, and selecting M omnidirectionally receiving EMATs as receiving transducers, where N and M are each positive integers, an emission angle of each of the N controllable emitting EMATs is in a range of $\theta_1$ to $\theta_2$ and has a step of $\theta_s$, and a total number of the emission angles is L=$(\theta_2-\theta_1)/\theta_s+1$;
S2, selecting an $n^{th}$ controllable emitting EMAT as an excitation transducer $T_n$, where n=1, 2, ..., N;
S3, obtaining an emission angle $\theta_l$ of the $n^{th}$ controllable emitting EMAT, and exciting an ultrasonic guided wave in a metal plate to be detected by the $n^{th}$ controllable emitting EMAT with the emission angle $\theta_l$, where l=1, 2, ..., L;
S4, selecting from the M omnidirectionally receiving EMATs M1 omnidirectionally receiving EMATs by which the ultrasonic guided wave in the metal plate is received and which are denoted by $R_{ml}$, where ml=1, 2, ..., M1, and determining whether each of the M1 omnidirectionally receiving EMATs $R_{ml}$ and the $n^{th}$ controllable emitting EMAT $T_n$ form a scattering group $(T_n, R_{ml})$, if yes, executing step S5, otherwise, executing step S7;
S5, for the scattering group $(T_n, R_{ml})$, solving a position P of a scattering point according to a distance between $T_n$ and $R_{ml}$, the emission angle and a travel time of the ultrasonic guided wave;
S6, determining a propagation path and a scattering path of the ultrasonic guided wave, and solving a direction of a scattering side, according to the position P of the scattering point and a position of the scattering group $(T_n, R_{ml})$;

S7, determining whether excitation and receiving of the ultrasonic guided wave with all the emission angles $\theta_l$ are performed, if yes, executing step S8, otherwise, changing the emission angle to $\theta_{l+1}$ and returning to step S3;

S8, determining whether all the N controllable emitting EMATs have excited the ultrasonic guided wave, if yes, executing step S9, otherwise, selecting an $(n+1)^{th}$ controllable emitting EMAT as an excitation transducer $T_{n+1}$ and returning to step S2;

S9, performing a curve fitting on all the scattering points in directions of respective scattering sides to obtain a contour image of the defect.

11. The device of claim 10, wherein each of the N controllable emitting EMATs comprises a plurality of concentric open metal rings and a rotary slider embedded with a metal conductor for adjusting the emission angle.

12. The device of claim 10, wherein each of the M omnidirectionally receiving EMATs comprises a densely packed coil having a pie shape as a receiving coil.

13. The device of claim 10, wherein the N controllable emitting EMATs and the M omnidirectionally receiving EMATs are uniformly arranged around a detection region of the metal plate to be detected in a circular array, and M=K*N, where K is a positive integer.

14. The device of claim 13, wherein the number of the omnidirectionally receiving EMATs between two adjacent controllable emitting EMATs is constant.

15. The device of claim 10, wherein step S4 comprises:
determining whether each of the M1 omnidirectionally receiving EMATs $R_{ml}$ and the $n^{th}$ controllable emitting EMAT $T_n$ form the scattering group according to the travel time of the ultrasonic guided wave, comprising:
obtaining a measured travel time $t_r$ for which the ultrasonic guided wave propagates from $T_n$ to $R_{ml}$, and a propagation speed v of the ultrasonic guided wave in the metal plate, establishing a planar rectangular coordinate system, obtaining a position T of the $n^{th}$ controllable emitting EMAT $T_n$ and a position R of the omnidirectionally receiving EMAT $R_{ml}$, and calculating a theoretical time $t_s$ for which the ultrasonic guided wave directly propagates from the position T to the position R along a straight line:

$$t_s = \frac{|\overrightarrow{TR}|}{v}$$

where $|\overrightarrow{TR}|$ is a length of a vector from the position T to the position R in the planar rectangular coordinate system;

determining that $R_{ml}$ and $T_n$ form the scattering group if $t_r > t_s$, otherwise, determining that $R_{ml}$ and $T_n$ do not form the scattering group.

16. The device of claim 15, wherein step S5 comprises:
for the scattering group $(T_n, R_{ml})$, solving the position P of the scattering point according to the distance $\overrightarrow{TR}$ between $T_n$ and $R_{ml}$, the emission angle and the travel time $t_r$ of the ultrasonic guided wave, comprising:

obtaining a length $|\overrightarrow{RP}|$ of a vector $\overrightarrow{RP}$ according to the cosine theorem:

$$|\overrightarrow{RP}| = \sqrt{|\overrightarrow{PT}|^2 + |\overrightarrow{TR}|^2 - 2*|\overrightarrow{PT}|*|\overrightarrow{TR}|*\cos(\angle PTR)}$$

where $\angle PTR$ is known in $\Delta PTR$ in the planar rectangular coordinate system;

calculating a sum of a length $|\overrightarrow{PT}|$ of a vector $\overrightarrow{PT}$ and the length $|\overrightarrow{RP}|$ of the vector $\overrightarrow{RP}$ according to the measured travel time $t_r$ for which the ultrasonic guided wave propagates from $T_n$ to $R_{ml}$, and the propagation speed v of the ultrasonic guided wave in the metal plate:

$$|\overrightarrow{PT}| + |\overrightarrow{RP}| = v*t_r;$$

obtaining an equation:

$$|\overrightarrow{PT}| + \sqrt{|\overrightarrow{PT}|^2 + |\overrightarrow{TR}|^2 - 2*|\overrightarrow{PT}|*|\overrightarrow{TR}|*\cos(\angle PTR)} = v*t_r$$

determining the position P of the scattering point by solving the equation.

17. The device of claim 16, wherein step S6 comprises:
calculating the direction $$\left.\frac{dy}{dx}\right|_P$$

of the scattering side by a formula:

$$\left.\frac{dy}{dx}\right|_P = \tan\left[\arctan\left(\left.\frac{dy}{dx}\right|_{\overrightarrow{PT}}\right) - \left(\frac{\pi}{2} - \frac{1}{2}*\angle RPT\right)\right].$$

18. The device of claim 17, wherein step S9 comprises:
performing the curve fitting on all the scattering points to obtain a fitting curve D(x):

$$D(x) = \arg\left(\min\sum_{i=1}^{S}|\varphi(x_i) - y_i|^2 \text{s.t.} \left.\frac{d\varphi}{dx}\right|_{P_i} = \left.\frac{dy}{dx}\right|_{P_i}\right)$$

where S is the number of the scattering points and is a positive integer, $P_i(x_i, y_i)$ is a position of an $i^{th}$ scattering point, i=1, 2, . . . , S.

19. A non-transitory computer-readable storage medium having stored therein instructions that, when executed by a processor of a mobile terminal, causes the mobile terminal to perform a method for detecting the defect of the metal plate, the method comprising:

S1, selecting N controllable emitting electromagnetic acoustic transducers EMATs as excitation transducers, and selecting M omnidirectionally receiving EMATs as receiving transducers, where N and M are each positive integers, an emission angle of each of the N controllable emitting EMATs is in a range of $\theta_1$ to $\theta_2$ and has a step of $\theta_s$, and a total number of the emission angles is $L=(\theta_2-\theta_1)/\theta_s+1$;

S2, selecting an $n^{th}$ controllable emitting EMAT as an excitation transducer $T_n$, where n=1, 2, . . . , N;

S3, obtaining an emission angle $\theta_l$ of the $n^{th}$ controllable emitting EMAT, and exciting an ultrasonic guided wave in a metal plate to be detected by the $n^{th}$ controllable emitting EMAT with the emission angle $\theta_l$, where $l=1, 2, \ldots, L$;

S4, selecting from the M omnidirectionally receiving EMATs M1 omnidirectionally receiving EMATs by which the ultrasonic guided wave in the metal plate is received and which are denoted by $R_{ml}$, where $ml=1, 2, \ldots, M1$, and determining whether each of the M1 omnidirectionally receiving EMATs $R_{ml}$ and the $n^{th}$ controllable emitting EMAT $T_n$ form a scattering group $(T_n, R_{ml})$, if yes, executing step S5, otherwise, executing step S7;

S5, for the scattering group $(T_n, R_{ml})$, solving a position P of a scattering point according to a distance between $T_n$ and $R_{ml}$, the emission angle and a travel time of the ultrasonic guided wave;

S6, determining a propagation path and a scattering path of the ultrasonic guided wave, and solving a direction of a scattering side, according to the position P of the scattering point and a position of the scattering group $(T_n, R_{ml})$;

S7, determining whether excitation and receiving of the ultrasonic guided wave with all the emission angles $\theta_l$ are performed, if yes, executing step S8, otherwise, changing the emission angle to $\theta_{l+1}$ and returning to step S3;

S8, determining whether all the N controllable emitting EMATs have excited the ultrasonic guided wave, if yes, executing step S9, otherwise, selecting an $(n+1)^{th}$ controllable emitting EMAT as an excitation transducer $T_{n+1}$ and returning to step S2;

S9, performing a curve fitting on all the scattering points in directions of respective scattering sides to obtain a contour image of the defect.

* * * * *